United States Patent Office 3,102,146
Patented Aug. 27, 1963

3,102,146
α,α-BIS(p-AMINOPHENYL)-LOWER-ALKANONES
Jerome Korman, Portage Township, Kalamazoo County, Mich., assignor to The Upjohn Company, Kalamazoo, Mich., a corporation of Michigan
No Drawing. Filed Dec. 21, 1956, Ser. No. 629,781
5 Claims. (Cl. 260—590)

This invention relates to a new process for producing compositions of matter, and to novel intermediates obtained therein. It is particularly directed to a process for preparation of α,α-bis(p-aminophenyl)-lower-alkanones, and to novel intermediates, α,α-bis(p-nitrophenyl)-lower-alkanones, produced therein. The invention relates more particularly to an improved process for the synthesis of amphenone B, which compound is coincidentally shown to be 3,3-bis(p-aminophenyl)-2-butanone, and to the novel compound 3,3-bis(p-nitrophenyl)-2-butanone produced as an intermediate in this synthesis.

Amphenone B is an organic compound originally discovered by Allen and Corwin [J. Am. Chem. Soc. 72, 117 (1950)]; its structural formula was believed by them to be that of a substituted desoxybenzoin, as follows:

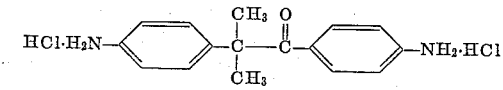

This compound is useful therapeutically in the treatment of Cushing's syndrome. It has been shown to possess antiestrogenic activity similar to that of progesterone [Hertz et al., Recent Progress in Hormone Research, 11, 119 (1955)], and it even exerts slight progestational activity. Amphenone B can be used as a Nembutal-like anesthetic in animals such as dogs, cats, rabbits, and the like. More recently [New England Jour. Med. 254, 547 (1956)], amphenone B was demonstrated to suppress 17-hydroxycorticoid production in a metastasizing carcinoma of the adrenal cortex. The homologue of amphenone B, obtained by Allen and Corwin from p-aminopropiophenone as starting material, is known to be similarly useful.

Amphenone B is prepared, according to the prior art, by electrolytic reduction of p-aminoacetophenone using either constant potential or constant current to yield a pinacol. The pinacol is converted to the active compound by a pinacol-pinacolone rearrangement. These electrolytic methods are disadvantageous due to the expense of the apparatus, and difficulties which arise as a result of the necessity for regulation of current density and potential.

It has now been found that the accepted structural formula for amphenone B is wrong, and that the correct configuration is as follows:

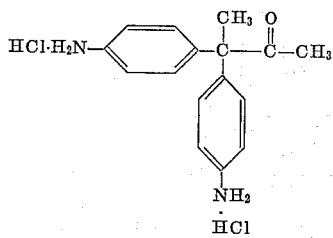

This discovery is the basis for the development of the present new and simplified chemical synthesis which eliminates the difficulties of the electrolytic method. Moreover, in accordance with the practice of the invention, higher homologues which are useful for the same purposes as amphenone B can be produced, as well as novel intermediates that can be readily transformed into these homologues.

Therefore, one of the principal objects of the invention is to provide a new process for the synthesis of amphenone B and its higher homologues. A more specific object is to provide a simplified chemical synthesis of amphenone B and its higher homologues. A further object is to develop a process of synthesis that establishes the structure of amphenone B. Other objects of the invention will become apparent to persons skilled in the art as the following description proceeds.

These objects of the invention have been accomplished by nitrating an α,α-diphenyl-lower-alkanone to form the α,α-bis(p-nitrophenyl)-lower-alkanone which is then reduced to the α,α-bis(p-aminophenyl)-lower-alkanone. The 3,3-bis(p-aminophenyl)-2-butanone prepared according to the present invention has been compared with amphenone B prepared according to the Allen and Corwin procedure. Characterizing physical data and biological activity are the same for both preparations.

The starting compounds of the invention, α,α-diphenyl-lower-alkanones having the following structural formula:

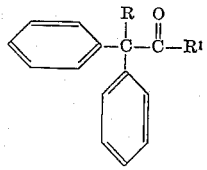

wherein R and R¹ are the same or different lower-alkyl radicals, can be prepared according to chemical methods that are well known in the art, a few of which will be described. Preferably, the sum of the carbon atoms in the lower-alkyl radicals R and R¹ is from two to six, inclusive, or in other words, the number of carbon atoms in the alkanone chain

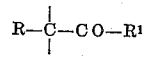

is from four to eight, inclusive. The same applies to the p-nitro- and p-amino-substituted compounds of the invention. Nitration of the α,α-diphenyl-lower-alkanone produces an α,α-bis(p-nitrophenyl)-lower-alkanone of the following structural formula:

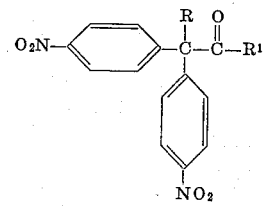

wherein R and R¹ are lower-alkyl radicals as described above. This novel α,α-bis(p-nitrophenyl)-lower-alkanone is then subjected to reduction in order to obtain an α,α-bis(p-aminophenyl)-lower-alkanone having the following structural formula:

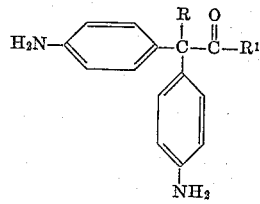

wherein R and R¹ are lower-alkyl radicals as described above.

The starting α,α-diphenyl-lower-alkanones can be prepared according to the method of Sisido and Nozaki [J. Am. Chem. Soc. 70, 776 (1948)]. Following their procedure, an appropriate alkanophenone (e.g., acetophenone, propiophenone, butyrophenone, isobutyrophenone) is condensed in the presence of aluminum foil and mercuric ion to form the pinacol [see Newman, J. Am. Chem. Soc. 62, 1683 (1940)], which is then subjected to acidic conditions to effect a pinacol-pinacolone rearrangement. This method is advantageous when R and R¹ are desired to be the same lower-alkyl radicals.

Another method for preparing the starting α,α-diphenyl-lower-alkanone has been described by Pickard and Engles [J. Am. Chem. Soc. 75, 2148 (1953)]. According to their procedure, α,α-diphenylpropionitrile is reacted with an alkyl Grignard reagent (R¹MgX) having the desired alkyl radical such as methyl, ethyl, propyl, butyl, amyl, isoamyl, and the like. A ketimine is formed which can be hydrolyzed to the desired ketone by refluxing with acid. Variations in R can be obtained by the above method if, before carrying out the Grignard reaction, diphenylacetonitrile is alkylated by alkylating methods known in the art, e.g., by that of Pickard and Engles [J. Am. Chem. Soc. 73, 864 (1951)], but replacing methyl iodide by other lower-alkyl halides such as ethyl iodide, propyl iodide, isopropyl bromide, sec.-butyl bromide, isoamyl bromide, and the like.

Nitration of the α,α-diphenyl-lower-alkanone can be effected by any of the commonly known methods for nitrating benzene derivatives. Thus a reaction mixture containing concentrated nitric acid in the presence of an acidic water-binding agent such as sulfuric acid, acetic anhydride, hydrofluoric acid, boron trifluoride, phosphorus pentoxide, nitric oxide (as in the case of fuming nitric acid) and the like are suitable. Other methods commonly employed in the art are: sulfuric acid and a nitrate such as ethyl nitrate, butyl nitrate, and the like; electrolysis in a solution containing nitric acid and the like.

Reduction of the resulting α,α-bis(p-nitrophenyl)-lower-alkanone to the α,α-bis(p-aminophenyl)-lower-alkanone can be effected by any of the means commonly used to convert aromatic nitro compounds to aromatic amino compounds. Thus, catalytic hydrogenation can be employed in the presence of a noble metal catalyst such as palladium (advantageously supported on charcoal, calcium carbonate, or other conventional supports), platinum oxide, and the like; or a base metal catalyst such as Raney nickel, Raney cobalt, and the like; and in the presence of an inert solvent such as dioxane, methyl alcohol, ethyl alcohol, isopropyl alcohol, and the like. Pressures ranging from about atmospheric pressure to about fifty pounds per square inch and temperature conditions ranging from about ten degrees centigrade to about fifty degrees centigrade can be employed in conducting the hydrogenation; atmospheric pressure and reaction temperatures of from about twenty degrees centigrade to about thirty degrees centigrade ordinarily being very convenient. Alternatively, chemical reducing agents can be employed, e.g., ammonium sulfide or ferrous sulfate in alkaline solution; or electrolytic reduction can be employed, e.g., in the presence of a mixture of dioxane and dilute hydrochloric acid. Other suitable methods are described in Kirk and Othmer, Encyclopedia of Chemical Technology, vol. 1, pp. 673 to 691. Catalytic hydrogenation is preferred, particularly catalytic hydrogenation in the presence of a noble metal catalyst.

In a preferred form of the invention, an α,α-diphenyl-lower-alkanone is dissolved in concentrated sulfuric acid and treated with a mixture of concentrated nitric and concentrated sulfuric acids. The nitro groups are thereby introduced into the phenyl groups at the para position. The nitration reaction is advantageously carried out at temperatures between about plus ten degrees centigrade and about minus fifty degrees centigrade, and more particularly between about zero degrees centigrade and about minus twenty degrees centigrade. The α,α-bis(p-nitrophenyl)-lower-alkanone, thus formed, is separated from the reaction mixture, dissolved in an inert solvent such as methylene chloride, adsorbed on a chromatographic column, and recovered in purified form therefrom, using a suitable eluant such as Skellysolve B containing 7.5 percent acetone.

Subsequent reduction of the p-nitro groups is advantageously accomplished by catalytic hydrogenation using dioxane as the solvent with palladium-on-charcoal catalyst and hydrogen at about one atmosphere pressure. After the hydrogenation has been completed, the resulting α,α-bis(p-aminophenyl)-lower-alkanone is isolated from the reaction mixture, dissolved in an anhydrous solvent such as absolute ethyl alcohol and converted to its dihydrochloride by introducing gaseous hydrogen chloride. The resulting α,α-bis(p-aminophenyl)-lower-alkanone dihydrochloride can be recrystallized if desired, e.g., from a mixture of ethyl alcohol and ethyl acetate.

Alternatively, the crude products of nitration after the acid by-products have been washed out with aqueous alkali or otherwise removed, can be reduced and the desired α,α-bis(p-aminophenyl)-lower-alkanone isolated by methods commonly employed in the art for separating mixtures of amines.

The following examples are illustrative of the process and products of the present invention, but they are not to be construed as limiting.

EXAMPLE 1

*Preparation of 3,3-Bis(p-Aminophenyl)-2-Butanone and Dihydrochloride Thereof*

A. 3,3-BIS(p-NITROPHENYL)-2-BUTANONE

Twenty-two and four-tenths (22.4) grams of 3,3-diphenyl-2-butanone (Sisido and Nozaki, supra) was dissolved in 65 grams of concentrated sulfuric acid and cooled to minus ten degrees centigrade. A mixture of 29 grams of concentrated nitric acid ($d=1.42$) and ninety grams of concentrated (98 percent) sulfuric acid was cooled to zero degree centigrade and added to the above, dropwise. The reaction mixture was gently shaken during the additions and the temperature was held at minus five degrees centigrade. This temperature was maintained for twenty minutes following treatment, and then the mixture was poured onto crushed ice. A tan, gummy solid was formed, which was filtered with suction and washed with ice water. Twenty-two (22) grams of the product was recovered. A 6.9-gram portion was dried, dissolved in methylene chloride, and chromatographed over Florisil (a magnesium silicate adsorbent) using various mixtures of Skellysolve B (essentially a mixture of methyl-substituted pentanes and n-hexane having a boiling range of 140–160 degrees Fahrenheit) and acetone as eluant. A fraction eluted by Skellysolve B containing 7.5 percent acetone gave, upon evaporation of the solvent, a colorless solid which was recrystallized from 95 percent ethyl alcohol. The yield of crystalline 3,3-bis(p-nitrophenyl)-2-butanone was 2.1 grams, and the melting point was 140–165 degrees centigrade. An analytical sample, prepared by a second recrystallization from 95 percent ethanol, melted at 165.5–167.5 degrees centigrade.

*Analysis.*—Calc'd. for $C_{16}H_{14}N_2O_5$: C, 61.14; H, 4.49; N, 8.92. Found: C, 61.29; H, 4.14; N, 9.24.

B. 3,3-BIS(p-AMINOPHENYL)-2-BUTANONE AND THE DIHYDROCHLORIDE

One gram of 3,3-bis(p-nitrophenyl)-2-butanone as prepared in Part A, above, was dissolved in fifty milliliters of dioxane, and 0.15 gram of five percent palladium-on-charcoal catalyst was added. This mixture was then exposed to hydrogen at atmospheric pressure until slightly more than the theoretical amount had been absorbed.

The catalyst was removed by filtration and the dioxane was removed by distillation. The residue, 3,3-bis(p-aminophenyl)-2-butanone, was dissolved in 35 milliliters of absolute ethyl alcohol, and the solution was saturated with gaseous hydrogen chloride. This solution was then evaporated to dryness in order to remove excess hydrogen chloride. The residue was suspended in twenty milliliters absolute ethyl alcohol diluted with an equal volume of ethyl acetate, and this mixture was kept in a refrigerator overnight. The resulting crystalline 3,3-bis(p-aminophenyl)-2-butanone dihydrochloride was recovered by filtration, washed with a mixture of equal volumes absolute ethyl alcohol and ethyl acetate, and dried. The product weighed 0.86 gram and melted at 252 degrees centigrade with decomposition.

Analysis.—Calc'd. for $C_{16}H_{20}Cl_2N_2O$: C, 58.72; H, 6.16; N, 8.56; Cl, 21.67. Found: C, 58.44; H, 6.38; N, 8.49; Cl, 21.10.

The free 3,3-bis (p-aminophenyl)-2-butanone can be obtained by treating the dihydrochloride with aqueous alkali.

EXAMPLE 2

Preparation of 3,3-Bis(p-Aminophenyl)-
2-Butanone Dihydrochloride

A solution of one gram of 3,3-bis(p-nitrophenyl)-2-butanone in 120 milliliters of dioxane and thirty milliliters of 2.5 normal hydrochloric acid was electrolyzed (thirty degrees centigrade) at a mercury cathode and at a constant potential of minus 1.05 volts versus a standard calomel electrode. The initial current was 0.57 ampere; the final current was 0.068 ampere. The solvent was removed by distillation, leaving 3,3-bis(p-aminophenyl)-2-butanone dihydrochloride as a residue.

EXAMPLE 3

Preparation of 2,2-Bis(p-Aminophenyl)-6-Methyl-
3-Heptanone and Dihydrochloride Thereof A. 2,2-BIS(p-NITROPHENYL)-6-METHYL-3-HEPTANONE Following the procedure of Example 1, Part A, but substituting 2,2-diphenyl-6-methyl-3-heptanone for 3,3-diphenyl-2-butanone, there is obtained 2,2-bis(p-nitrophenyl)-6-methyl-3-heptanone.

B. 2,2-BIS(p-AMINOPHENYL)-6-METHYL-3-HEPTANONE AND THE DIHYDROCHLORIDE

Following the procedure of Example 1, Part B, but starting with 2,2-bis(p-nitrophenyl)-6-methyl-3-heptanone, there are obtained 2,2-bis(p-aminophenyl)-6-methyl-3-heptanone and the dihydrochloride thereof.

EXAMPLE 4

Preparation of 4,4-Bis(p-Aminophenyl)-3-Hexanone
and Dihydrochloride Thereof

A. 4,4-BIS(p-NITROPHENYL)-3-HEXANONE

Following the procedure of Example 1, Part A, but substituting 4,4-diphenyl-3-hexanone (prepared by converting propiophenone to the corresponding pinacol and subjecting the latter to a pinacol-pinacolone rearrangement) for 3,3-diphenyl-2-butanone, there is obtained 4,4-bis(p-nitrophenyl)-3-hexanone.

B. 4,4-BIS(p-AMINOPHENYL)-3-HEXANONE AND THE DIHYDROCHLORIDE

Following the procedure of Example 1, Part B, but starting with 4,4-bis (p-nitrophenyl)-3-hexanone, there are obtained 4,4-bis(p-aminophenyl)-3-hexanone and the dihydrochloride thereof.

EXAMPLE 5

Preparation of 3,3-bis(p-Aminophenyl)-4-Methyl-
2-Hexanone and Dihydrochloride Thereof A. 3,3-BIS(p-NITROPHENYL)-4-METHYL-2-HEXANONE Following the procedure of Example 1, Part A, but substituting 3,3-diphenyl-4-methyl-2-hexanone (prepared by alkylating diphenylacetonitrile with sec-butyl bromide, reacting the resulting 2,2-diphenyl-3-methylvaleronitrile with methyl magnesium iodide, and hydrolyzing the ketimine thus obtained) for 3,3-diphenyl-2-butanone, there is obtained 3,3-bis(p-nitrophenyl)-4-methyl-2-hexanone.

B. 3,3-BIS(p-AMINOPHENYL)-4-METHYL-2-HEXANONE AND THE DIHYDROCHLORIDE

Following the procedure of Example 1, Part B, but starting with 3,3-bis(p-nitrophenyl)-4-methyl-2-hexanone, there are obtained 3,3-bis(p-aminophenyl)-4-methyl-2-hexanone and the dihydrochloride thereof.

It is to be understood that the invention is not to be limited to the precise details of operation or exact compounds shown and described, as obvious modifications and equivalents will be apparent to one skilled in the art, and the invention is therefore to be limited only by the scope of the appended claims.

I claim:

1. A compound having the following general structural formula:

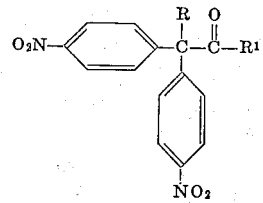

wherein R and R¹ are lower-alkyl radicals, the sum of the carbon atoms in said radicals being from two to six, inclusive.

2. The compound, 3,3-bis(p-nitrophenyl)-2-butanone.
3. The compound, 4,4-bis(p-nitrophenyl)-3-hexanone.
4. The compound, 2,2-bis(p-nitrophenyl)-6-methyl-3-heptanone.
5. The compound, 3,3-bis(p-nitrophenyl)-4-methyl-2-hexanone.

References Cited in the file of this patent

UNITED STATES PATENTS

| | | |
|---|---|---|
| 1,104,611 | Blangey | July 21, 1914 |
| 1,926,837 | Cupery | Sept. 12, 1933 |
| 2,454,468 | McArdle | Nov. 23, 1948 |
| 2,537,309 | Kropa | Jan. 9, 1951 |
| 2,658,925 | Cenker et al. | Nov. 10, 1953 |
| 2,673,172 | Polen et al. | Mar. 23, 1954 |
| 2,901,508 | Korman | Aug. 25, 1959 |

OTHER REFERENCES

"Organic Chemistry," 2nd English edition, Karrer, pages 400–402, Elsevier Pub. Co., New York (1946).

Fichter et al.: Berichte, vol. 37, pages 1992–1994 (1904).

Hertz: Proceedings of the Society for Experimental Biology and Medicine, vol. 75, page 627 (1950).

Pickard et al.: Journal of the American Chemical Society, vol. 75, page 2148 (1953).

Wedekind et al.: Justus Liebigs Annalen der Chemie, 378 (1910).